(12) United States Patent
Intrater et al.

(10) Patent No.: US 8,291,125 B2
(45) Date of Patent: Oct. 16, 2012

(54) SPECULATIVE READ-AHEAD FOR IMPROVING SYSTEM THROUGHPUT

(75) Inventors: Gideon David Intrater, Sunnyvale, CA (US); Biao Jia, Lake Elsinore, CA (US); Teck Huat Kerk, Singapore (SG); Qing Yun Li, San Diego, CA (US)

(73) Assignee: SMSC Holdings S.a.r.l., Luxembourg (LU)

( * ) Notice: Subject to any disclaimer, the term of this patent is extended or adjusted under 35 U.S.C. 154(b) by 0 days.

(21) Appl. No.: 13/028,762

(22) Filed: Feb. 16, 2011

(65) Prior Publication Data

US 2012/0210027 A1    Aug. 16, 2012

(51) Int. Cl.
G06F 3/00 (2006.01)
(52) U.S. Cl. ............................. 710/4; 711/204
(58) Field of Classification Search .......... 710/4
See application file for complete search history.

(56) References Cited

U.S. PATENT DOCUMENTS

| | | | |
|---|---|---|---|
| 5,987,530 A | 11/1999 | Thomson | |
| 6,073,205 A | 6/2000 | Thomson | |
| 6,393,493 B1 | 5/2002 | Madden et al. | |
| 6,412,028 B1 | 6/2002 | Steed et al. | |
| 6,825,631 B1 * | 11/2004 | Nakamura | 318/560 |
| 7,464,218 B2 * | 12/2008 | Thiessen et al. | 711/112 |
| 2005/0050280 A1 * | 3/2005 | Yap et al. | 711/137 |
| 2005/0223175 A1 * | 10/2005 | Hepner et al. | 711/137 |
| 2006/0075164 A1 * | 4/2006 | Ooi | 710/58 |
| 2009/0094435 A1 * | 4/2009 | Lu | 711/216 |
| 2011/0055456 A1 * | 3/2011 | Yeh | 711/103 |

* cited by examiner

Primary Examiner — Elias Mamo

(57) ABSTRACT

Systems and methods for a mass storage device attached to a host device use speculation about the host command likely to be received next from the host device based on a previously received command to improve throughput of accesses to the mass storage device. Host commands are used to speculatively produce commands for data storage devices of the mass storage device, such that host commands speculated as being likely next can be started during idle time of the data storage devices, based upon the probability that the speculation will be correct some of the time, and otherwise wasted idle time will be more efficiently used. Time taken by the host device to produce successive commands to the mass storage system is monitored, and future speculatively produced commands are parameterized to complete within the observed host time to produce new commands, making more efficient use of the data storage devices.

24 Claims, 10 Drawing Sheets

SPECULATIVE READ-AHEAD FOR IMPROVING SYSTEM THROUGHPUT

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

A host device such a personal computer (PC) may access data on one or more mass storage devices via a Universal Serial Bus (USB) link. Such USB-linked mass storage devices may comprise a disk drive having a rotating storage media, or a solid state drive based upon semiconductor memory devices. Access by the PC to the data stored on the USB-connected mass storage device may employ a software driver in the PC for issuing commands to the mass storage device over the USB link. Such software drivers frequently use a block-only-transport (BOT) protocol that supports transfers of no more than 64 kilobytes (KB) per command. If an application wishes to transfer an amount of data greater than 64 KB, the driver breaks the transfer into a sequence of 64 KB transfers.

Each transfer of data between the PC and the mass storage device involves an amount of processing by the central processing unit (CPU) of the PC, to formulate and communicate a command to the mass storage device, followed by the transfer of the data to/from the mass storage device. During the time that the PC is preparing the command for transmission to the mass storage device, the mass storage device may be idle.

A USB mass storage device comprises one or more memory devices such a solid state or moving storage media, in addition to media controller and USB device controller functionality. The media controller and the USB device controller act as an interface between the USB connection with the host device, and the data storage device(s) use for data storage.

A USB host device such as, for example, a laptop, notebook, netbook or desktop PC; a personal digital assistant (PDA), a cellular telephone, or other intelligent device interfaces to a USB mass storage device through a host controller and host driver software. The USB host controller communicates with the USB device controller in the USB mass storage device over a multi-wire connection that includes power, ground, and data signals.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

The present invention relates to devices, methods, and systems supporting speculative read-ahead in USB-connected mass storage devices, substantially as shown in and/or described in connection with at least one of the figures, as set forth more completely in the claims.

These and other advantages, aspects, and novel features of the present invention, as well as details of illustrated embodiments, thereof, will be more fully understood from the following description and drawings.

DETAILED DESCRIPTION OF THE INVENTION

Aspects of the present invention relate in general to access to data in mass storage devices by a host device via a Universal Serial Bus (USB) link. More specifically, aspects of the present invention relate to devices, systems, and methods that enable a USB mass storage device such as those comprising moving or solid state storage media to improve mass storage device throughput by employing speculative read-ahead.

Although the following discussion makes frequent reference to the use of the disclosed devices and techniques in embodiments of a USB mass storage device, the inventive concepts presented herein are not specifically limited only to that use, and may find application in other electronic devices known now or in the future.

The term "mass storage" is used herein to refer to any form of non-volatile memory of a capacity significantly larger and having longer access times than the location-addressable memory having faster access times normally directly accessed by a CPU for storage of executable instructions and data during program execution. While at the time of this application a number of different forms of mass storage are in use including, for example, moving media magnetic and optical storage and solid state semiconductor memory, the present application is not specifically limited in its use to the currently available forms of mass storage.

The term "speculative read-ahead" is used herein to refer to the act of automatically accompanying a read of a requested first portion of a storage media with a read of a not-yet-requested second portion of the storage media. This may be desirable in order to realize a larger performance gain when the second portion is the next requested, than the performance impact when the second portion is not the next requested. The terms "speculatively generated" and "speculatively produced" instruction or command are used herein to describe a second instruction or command generated/produced by the recipient of a first instruction or command. Doing so may be desirable in order to realize a larger performance gain when the second instruction or command is the next instruction/ command received after receipt of the first instruction or command, than the performance impact when the second instruction or command is not next after receipt of the first instruction or command.

It should be noted that although this disclosure describes communication between a "host device" and a "mass storage device" using a communication path complying with a communication protocol standard referred to as the Universal Serial Bus (USB) protocol, the inventive concepts presented do not require the use of the USB protocol, and may be applicable to other mass storage memory devices connected to other host devices using other communication means than those examples provided herein.

Figure 1:
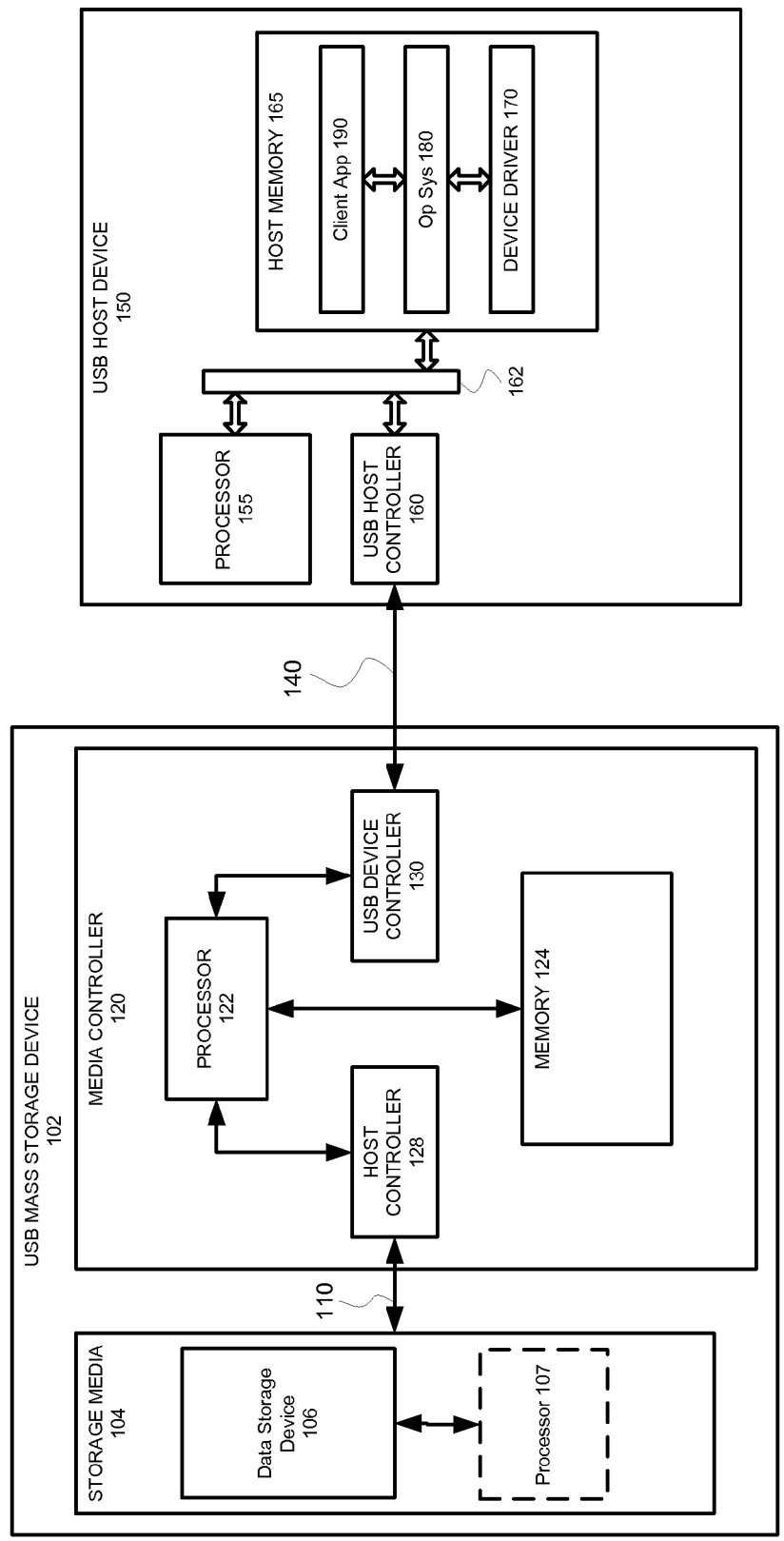
FIG. 1 is a block diagram showing an exemplary prior art USB mass storage device connected by a USB link to a USB host device. The USB host device of FIG. 1 comprises a processor, a USB host controller, and a host memory comprising a device driver, an operating system (OS), and a client application.

FIG. 1 is a block diagram showing an exemplary prior art USB mass storage device 102 connected by a USB link 140 to a USB host device 150. The USB host device 150 of FIG. 1 comprises a processor 155, a USB host controller 160, and a host memory 165 comprising a device driver 170, an operating system (OS) 180, and a client application 190. The processor 155 performs the executable code of client application 190, which calls upon services provided by the OS 180. Those services include, for example, access to stored data and executable code in the host memory 165 and other devices connected to the host device 150, such as the USB mass storage device 102. USB host device access to the USB mass storage device 102 is enabled by the USB controller 160, which is controlled by the executable code of the device driver 170.

As shown in FIG. 1, the USB mass storage device 102 comprises storage media 104. The storage media 104 may comprise any suitable non-volatile data storage device 106 including, for example, a moving media drive such as a rotating magnetic or optical disk, or suitable solid state semiconductor memory, and a processor 107. The storage capacity of the storage media 104 may be addressable in units such as, for example, sectors, blocks, tracks, and cylinders, to name only a few possible units. The capacity of the mass storage device 102 may range, for example, from a few megabytes to terabytes or more.

It should be noted that although FIG. 1 illustrates the storage media 104 as a single entity, that does not represent a specific limitation of the present invention. The storage media of a representative embodiment of the present invention may include one, two, or more data storage devices 106 using any combination of suitable storage technologies without departing from the scope of the present invention. As explained above, the memory devices making up the storage media 104 may be moving media devices such as magnetic and optical disks, or solid state media such as semiconductor memory.

The USB mass storage device 102 of FIG. 1 also comprises a media controller 120, which is illustrated in FIG. 1 as including a host controller 128, a processor 122, a memory 124, and a USB device controller 130. The media controller 120 manages the operation of the data storage device(s) comprising storage media 104 via the host controller 128 and communication link 110 that may be compatible with, for example, a Serial AT Attachment (SATA) device interface protocol standard. In addition, the media controller 120 interfaces to the USB device controller 130. Although shown as part of a single entity, the functionality of the host controller 128, the processor 122, the memory 124, and the USB device controller 130 include within the media controller 120 may be combined or arranged in other ways to perform the functions of the media controller 120 shown in FIG. 1. The management of the data storage device(s) of the storage media 104 of FIG. 1 includes, for example, receiving commands and parameters from the USB host device 150, execution of the received commands upon the storage media 104, transfer of data to/from the storage media 104 from/to the USB host device 150, and communication of any result(s) of command execution from the storage media 104 and media controller 120 to the USB host device 150, via the USB device controller 130 and USB link 140. The media controller 120 may, for example, support the mapping of address information received from the USB host device 150 to a corresponding location in the storage architecture of the storage media 104. Address information sent to the storage media 104 by the media controller 120 may be represented as either physical addresses (e.g., sector, block, track, cylinder), or may use a logical block address (LBA) scheme, depending upon the nature of the storage media 104. Additional details of the operation of the media controller 120, the USB device controller 130, and the USB host device 150 are given below with respect to FIG. 2.

The USB device controller 130 shown in FIG. 1 represents interface circuitry for transmitting electrical signals onto and receiving electrical signals from the USB link 140 according to the USB protocol standard in use. The USB device controller 130 interfaces with the USB link 140 and the media controller 120, passing commands and data received from the USB host device 150 to the media controller 120, and sending status information and data from the media controller 120 to the USB host device 150. Although shown as a single entity, the functionality included in the media controller 120 of FIG. 1, that is, of the host controller 128, processor 122, memory 124, and the USB device controller 130, may be combined in various sub-combinations including into a single functional device. Further, the functionality of the media controller 120 may be implemented as hardware, or as a combination of hardware and software/firmware. The USB mass storage device 102 may be powered from the USB link 140 or may be self powered.

The USB link 140 illustrated in FIG. 1 may be compliant with the full-speed, hi-speed, or super-speed USB protocol requirements. Additional details of the Universal Serial Bus standards are available from the USB Implementers Forum (USB-IF) (http://www.usb.org). While merely shown as a line representing an electrical connection comprising the power, ground, and data signals of the applicable USB standard, the USB link 140 may also comprise one or more elements referred to as "hubs" that are used to provide access to USB host device 150 by a plurality of USB compatible devices, including USB mass storage devices such as the USB mass storage device 102 shown in FIG. 1.

The USB host controller 160 of FIG. 1 represents the interface circuitry for transmitting electrical signals onto and receiving electrical signals from the USB link 140, in accordance with the chosen USB protocol standard.

The device driver 170 of FIG. 1 represents executable code that interfaces between the interface circuitry of the USB host controller 160 and the OS 180, to allow the executable code of client application 190 and the OS 180 of the USB host device 150 to communicate with the USB mass storage device 102 over the USB link 140.

The operating system (OS) 180 represents executable code that interfaces between a client application such as client application 190 and the hardware resources of the computing platform that makes up the USB host device 150 such as, for example, the processor 155, user input devices (not shown), display devices (not shown), sound input and output circuitry (not shown), and any other circuitry suitable to support use of the host device by a user.

The client application 190 in the USB host device 150 represents executable application code (in contrast to operating system or device driver code) that accesses the storage media 104 using file-type operations or system calls supported by the OS 180 and device driver 190. The client application 190 of FIG. 1 performs operations specific to a particular task of a user. It should be noted that, although FIG. 1 illustrates a client application 190 running on an operating system 180, where the client application 190 communicates through the OS 180 and device driver 170 with the USB host controller 160, other configurations that combine or divide the functionality in a different manner may be also be employed, and that the configuration and division of functionality of FIG. 1 do not represent specific limitations of a representative embodiment of the present invention.

As previously mentioned, USB mass storage devices such as the USB mass storage device 102 of FIG. 1 frequently communicate with a USB host device such as the USB host device 150 using a mechanism referred to as the "bulk-only-transport (BOT)" protocol that is described in the document "Universal Serial Bus Mass Storage Class Bulk-Only Transport," Revision 1.0, Sep. 31, 1999, © 1999, USB Implementer Forum, which is hereby incorporated herein by reference. Also as previously discussed, the support provided by a device driver such as the device driver 170 of FIG. 1 is frequently limited to data transfers of 64 KB or less in size. Operating system and/or device driver software such as the OS 180 and device driver 170 may, for example, break up read or write operations involving transfers of greater than 64 KB into a sequence of transfers of 64 KB or less.

Figure 2:
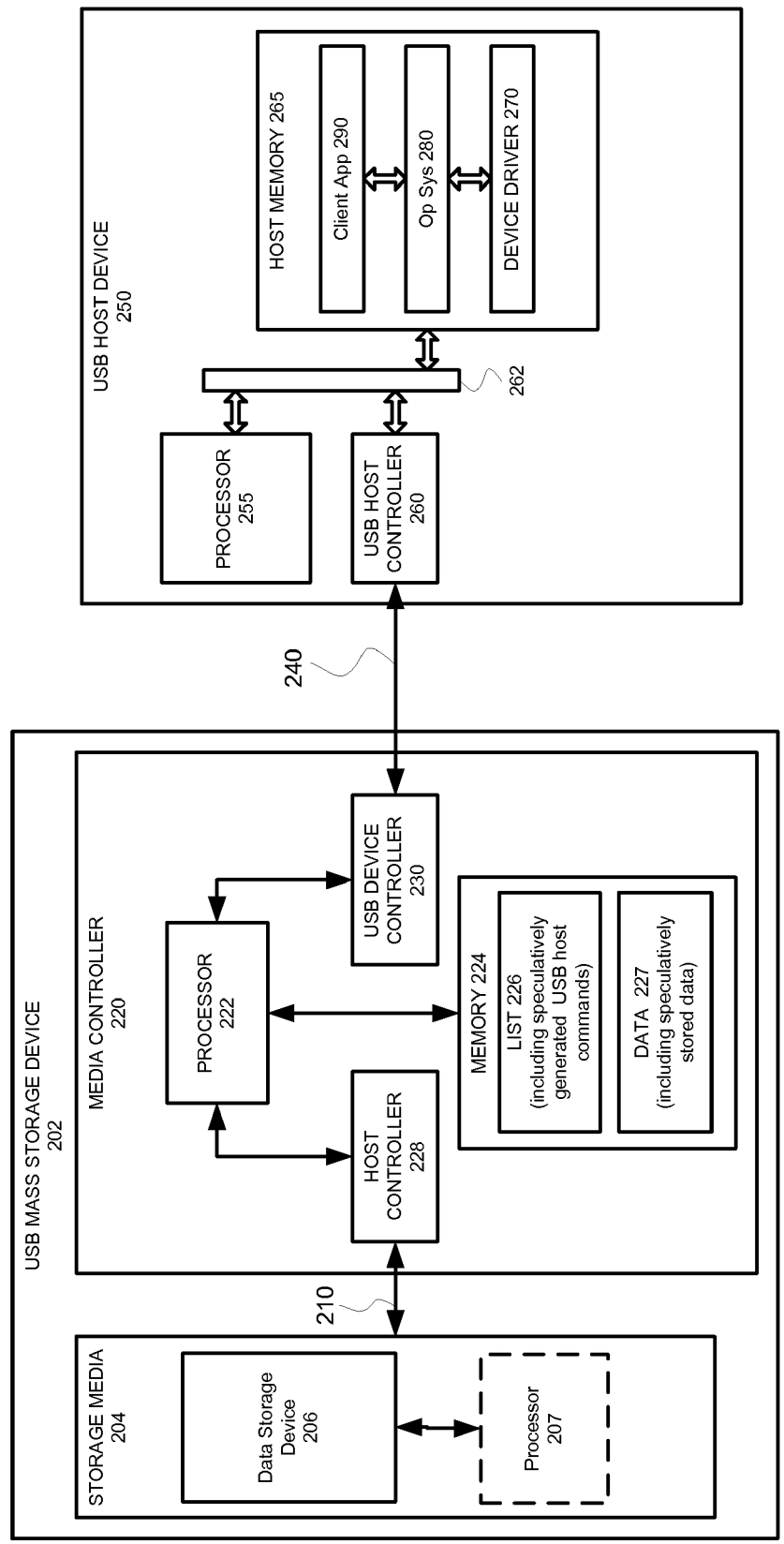
FIG. 2 is a block diagram showing an exemplary USB mass storage device connected by a USB link to a USB host device in which operation of the USB mass storage device supports speculative read-ahead of the storage media in USB mass storage device, in accordance with a representative embodiment of the present invention.

FIG. 2 is a block diagram showing an exemplary USB mass storage device 202 connected by a USB link 240 to a USB host device 250 in which operation of the USB mass storage device 202 supports speculative read-ahead of the storage media 204 in USB mass storage device 202, in accordance with a representative embodiment of the present invention. The USB host device 250 of FIG. 2 comprises a processor 255, a USB host controller 260, and a host memory 265 comprising a device driver 270, an operating system (OS) 280, and a client application 290. It should be noted that although shown in FIG. 2, the use of the OS 280 is not a specific limitation of the present invention. The processor 255 may comprise any suitable central processing unit, microprocessor, or microcomputer from manufacturers such as Intel, Advanced Micro Devices, Freescale, or other manufacturers. The processor 255 performs the executable code of client application 290, which may call upon services provided by the operating system (OS) 280. It should be noted that use of an operating system, such as that represented by OS 280 of FIG. 2, is not necessary and does not represent a specific limitation of a representative embodiment of the present invention. The services provided by operating system 280 may include access to stored data and executable code in the host memory 265 and to other devices connected to the USB host device 250, such as the USB mass storage device 202. Access to the USB link 240, and therefore, the USB mass storage device 202, by the USB host device 250, is enabled by the USB host controller 260, which is supervised by the processor 255 over an interconnect bus such as bus 262, while performing the executable code of the device driver 270. In one representative embodiment of the present invention, the processor 255 may directly control all actions of the USB host controller 260, transferring commands, parameters, and/or data to/from the USB host controller 260 from/to the processor 255 and host memory 265. In other representative embodiments, the processor 255 may place commands, parameters, and/or data in locations in the host memory 265 and direct the USB host controller 260 to begin processing the commands, parameters, and/or data stored in identified locations in the host memory 265 using direct memory access (DMA) by the USB host controller 260 to the host memory 265.

The USB mass storage device 202 of FIG. 2 comprises storage media 204, and a media controller 220. The illustration of FIG. 2 shows the storage media 204 of the USB mass storage device 202 as a data storage device 206, that may include its own processor 207, and that may be, for example, a hard disk drive complying with the Serial AT Attachment (SATA) device interface protocol standard. It should be noted that the use of a single hard disk drive as data storage device 206, as illustrated in FIG. 2, is not a specific limitation of the present invention, as a larger number of data storage devices of various types from any of a variety of manufacturers and using different device interface protocol standards may be employed without departing from the spirit and scope of the present invention. In addition, the organization and technology used in storing information on the data storage device represented as data storage device 206 also does not represent a specific limitation of the present invention, as the inventive concepts disclosed herein may be applicable to hard disk drives and other forms of data storage employing storage mechanisms and technologies known now or in the future, having different storage characteristics, sizes, and arrangements.

As shown in exemplary embodiment of FIG. 2, a USB mass storage device of a representative embodiment of the present invention, such as the USB mass storage device 202, also comprises a media controller 220. Like the media controller 120 of FIG. 1, the media controller 220 of FIG. 2 may provide functionality for managing the operation of the storage media 204 via a host controller 228 over the communication link 210, which may be compatible with, for example, a Serial AT Attachment (SATA) device interface protocol standard. The media controller 220 of FIG. 2 includes the functionality for communicating with the USB host device 250 via the USB device controller 230. It should again be noted that although FIG. 2 shows the USB device controller 230 as a part of the media controller 220, this does not represent a specific limitation of the present invention, as the functionality of the media controller 220 and the USB device controller 230 may be implemented in a single device or in separate devices in various representative embodiments of the present invention. In a representative embodiment of the present invention, the media controller 220 may also comprise one or more processors, illustrated in FIG. 2 as processor 222, and memory for storing data and operating parameters, shown in FIG. 2 as memory 224. The media controller 220 may receive commands and data from the USB host device 250 via the USB link 240 and USB device controller 230, and may process the received commands into command(s)/instruction(s) of a form compatible with the data storage devices(s) 206 of the storage media 204. Status/response information and data from the data storage device(s) 206 of storage media 204 may then be processed by the media controller 220 into a form compatible with transmission to USB host device 250 over USB link 240 by USB device controller 230.

The media controller in a representative embodiment of the present invention, such as the media controller 220 of FIG. 2, may also include functionality to map address information received from the USB host device 250 to the form needed by the storage architecture of the data storage devices of the storage media 204, where such forms may include a physical address or a logical block address, according to the needs of the data storage device 206. The media controller 220 may support the use of error correction codes to detect and correct errors in the data stored in the storage media 204 or to store data redundantly over two or more data storage devices, such as the data storage device 206 of FIG. 2. In addition, the media controller 220 may support mapping of defective portions of the data storage devices 206 of the storage media 204 to other portions reserved as replacement storage.

As illustrated in FIG. 2, a USB mass storage device in accordance with a representative embodiment of the present invention also comprises a USB device controller, represented in FIG. 2 as USB device controller 230. The USB device controller 230 of FIG. 2 is similar in many ways to the USB device controller 130 of FIG. 1, in that it also acts as an interface between the USB link 240 and the media controller 220. In that role, the USB device controller 230 may pass commands and data from the USB host device 250 to the media controller 220, and status information and data from the media controller 220 to the USB host device 250. Although shown as separate elements, the functionality of the media controller 220 and the USB device controller 230 may be combined or distributed in a manner different from the description provided herein, including providing all functionality within a single device, without departing from the spirit and scope of the present invention. Further, the USB media controller 220 and the USB device controller 230 of FIG. 2 may be realized as hardware, or as a combination of hardware and software/firmware, and may be powered from the USB link 240 or by a power source within or separately connected to the USB mass storage device 202. Additional functionality specific to a media controller and USB device controller in accordance with a representative embodiment of the present invention will be discussed in detail below.

The illustration of FIG. 2 also includes a USB link 240 that connects the USB mass storage device 202 to the USB host device 250. The USB link of a representative embodiment of the present invention, such as the USB link 240, may operate according to the full-speed, hi-speed, or super-speed USB protocol requirements, as described above with respect to the USB link 140 of FIG. 1. Also as in the USB link 140, the USB link 240 of FIG. 2 may comprise one or more elements referred to as "hubs" that permit access to USB host device 250 by other USB compatible devices.

The representative embodiment of the present invention shown in FIG. 2 also includes a USB host device 250. The USB host device 250 is similar in many ways to the USB host controller 150 of FIG. 1, in that the USB host controller 250 comprises a USB host controller 260, a device driver 270, an operating system (OS) 280, and at least one client application 290, which provide many of the same functions as the USB host controller 160, the device driver 170, the operating system (OS) 180, and the client application 190, respectively, of FIG. 1.

The USB host controller 260 of FIG. 2 represents interface circuitry that transmits and receives electrical signals over the USB link 240 from the USB device controller 230 of the USB mass storage device 202, in accordance with the USB protocol standard in use. The USB host controller 260 communicates command, control, and status information, and data, to/from the USB mass storage device 202 under control of the processor 255. The transfer of data may use, for example, direct memory access (DMA) to off-load the work of transferring of blocks of data to/from a USB mass storage device such as the USB mass storage device 202 from/to the host memory 265 of FIG. 2.

The device driver 270 of FIG. 2 represents executable code and data used to communicate command, control, and status information, and data, between the interface circuitry of the USB host controller 260, and the client application 290 and OS 280. The executable code and data of device driver 270 enables the client application 290 of the USB host device 250 to communicate through the OS 280 with the USB mass storage device 202 over the USB link 240.

Access to the data stored on a USB mass storage device is initiated by an application or an operating system (e.g., client application 290 or operating system 280 running on processor 255) in the form of one or more commands generated by a device driver (e.g., device driver 270) and sent by a USB host device to a USB mass storage device, such as the USB host device 250 and the USB mass storage device 202 of FIG. 2, respectively. In instances where the storage media of the USB mass storage device such as, for example, the storage media 204 of USB mass storage device 202, is made up of disk drives compatible with the SATA interface protocol, the hardware and/or software of the USB mass storage device 202 may be compliant with the Serial ATA Advanced Host Bus Interface (AHCI) Rev. 1.3, © 2008 Intel Corporation. This document describing the details of Rev. 1.3 of the AHCI application is available at <http://www.intel.com/technology/serialata/ahci.htm> and is hereby incorporated herein by reference in its entirety.

The Universal Serial Bus (USB) standards previously mentioned define what is referred to as a "block-only transport" (BOT) protocol that is used for the transfer of data between a host device and a mass storage device such as, for example, the USB host device 250 and the USB mass storage device 202, illustrated in FIG. 2. With specific reference to members of the family of Microsoft Windows® operating systems, the Microsoft-supplied device driver that supports the BOT protocol limits data transfers to a maximum size of 64 KB per transfer.

If application software (e.g., the client application 290 of FIG. 2) requests a transfer of an amount of data larger than 64 KB, the device driver provided with the operating system (e.g., the device driver 270 shown with the operating system 280) breaks the requested transfer of greater than 64 KB into a sequence of commands each requesting transfers of 64 KB or less to/from the USB mass storage device. Because blocks/files of data stored on mass storage devices such as USB mass storage device 202 are frequently much larger than the 64 KB limitation of some operating system BOT drivers, there is a very good probability that a USB mass storage device that receives a command to transfer the maximum allowed amount of data (e.g., 64 KB) of a particular block/file of data will next receive a command for another transfer of the maximum amount of data (e.g., another 64 KB) from/to the same block/file of data accessed by the earlier transfer. Even for received commands involving transfers of lesser amounts of data, there is a very high probability that two consecutive commands will be for transfers of the same size and in the same direction (i.e., read or write). The location of successive transfers in the block/file of data of interest may not be adjacent, however.

When a command requesting transfer of data from/to the USB host device 250 to/from the USB mass storage device 202 is sent by the processor 255 to a USB mass storage device such as USB mass storage device 202, direct memory access (DMA) functionality in USB host device 250 and USB mass storage device 202 may handle the actual transfer of the data between the USB host device 250 and the USB mass storage device 202. This frees the processor 255 of the USB host device 250 and the processor 222 of USB mass storage device 202 to perform other tasks.

In a representative embodiment of the present invention, the processor (e.g., processor 222) of a USB mass storage device such as, for example, the USB mass storage device 202 may make use of the time during which data is transferred using DMA to speculatively create one or more AHCI instructions/commands that are likely to correspond to the next commands received by the USB mass storage device 202 from the USB host device 250.

In one representative embodiment of the present invention, a media controller such as, for example, the media controller 220 of FIG. 2 reduces access delays and improves data transfer efficiency, in part, by using speculative read-ahead of the data storage device(s) 206. This is accomplished by processor 222 by overlapping speculative generation of future commands for the storage media 204, with current activity of the storage media 204. The speculative generation of commands is based on what commands are most likely to be received next from the USB host device 250 in light of the most recently received command(s).

For example, with reference to FIG. 2, the processor 255 may use the USB host controller 260 of USB host device 250 to send a suitable command to the USB mass storage device 202 over USB link 240 to initiate a "READ" of 64 KB of data at an identified location in the storage media 204. Upon receiving the "READ" command, the processor 222 of the media controller 220 may, for example, translate the information in the received "READ" command to one or more instructions/commands appropriate for the data storage device 206 of the storage media 204 containing the requested data, to perform the requested read access defined by the "READ" command received from the USB host device 250 by the USB mass storage device 202. It should be noted that the instructions/commands appropriate for the data storage device 206 may also be referred to herein as "AHCI records."

While the data storage device 206 containing the requested data is active performing the read access and during transfer of the data from the USB mass storage device 202 to the USB host device 250, the processor 222 of the USB media controller 220 may be waiting for the next command from the USB host device 250. As a result of use of DMA-type transfer of the data to the USB host device 250, the processor 222 may not be fully occupied. In a representative embodiment of the present invention, the processor 222 may use the information in the received "READ" command and overlap speculative generation/production of one or more additional commands with the transfer of data to the USB host device 250. The additional commands speculatively generated/produced may correspond to some of the commands most likely to be the next command received by the USB mass storage device 202 from the USB host device 250. As previously discussed above, one of the commands most likely to be received after a "READ" command may be, for example, another "READ" command to access the next 64 KB of data beginning at the location in the data storage device 206 immediately following the 64 KB of data just read from the storage media 204 of the USB mass storage device 202.

In one representative embodiment of the present invention, the processor 222 stores in memory of the USB mass storage device 202 (e.g., in the memory 224) each of the commands speculatively selected as likely to be received next from the USB host device 250. The portion of memory used for the storage of speculatively generated commands within memory 224 is illustrated in FIG. 2 as list 226. The portion of memory 224 used to store data that may be created/used in the process of generating the list of speculatively generated commands 226 is shown in FIG. 2 as data 227. The processor 222 may then translate each of those speculatively generated commands into one or more instructions/commands suitable for execution by the appropriate data storage device 206 of USB mass storage device 202, and may store those instructions/commands in association with the corresponding command speculated as likely to be the next command received from the USB host device 250, in memory 224. For example, as previously discussed, one of the commands most likely to be received from the USB host device following the receipt of a first "READ" command includes another "READ" command to access a next portion of the same block/file from which data was previously read. In the above manner, the media controller 220 of one representative embodiment of the present invention creates a collection of USB host commands most likely to be received next, and a translated form ready to be sent to the data storage device that will perform the actions of the command.

In a representative embodiment of the preset invention, the processor 222 of the media controller 220 may, upon receipt of a next command from the USB host device 250, compare the next received command from the USB host device 250 to each of the commands speculatively generated and stored in list 226 of memory 224 in the USB mass storage device 202. If one of the stored commands matches the most recently received command, the processor 222 simply transmits the stored instructions/commands associated with the matching USB host command to the appropriate data storage device 206 to initiate the desired actions. If, however, none of the stored speculative USB host commands matches the most recently received USB host command, the processor 222 clears the collection of stored commands and associated instructions/commands stored in memory (e.g., list 226), translates the information in the received USB host command to one or more instructions/commands appropriate for the affected data storage device 206 of the storage media 204, and transmits the instructions/commands to the affected data storage device 206. As described above, the processor 222 then uses the time while the data storage device 206 is busy executing the instructions/commands translated from the newly received USB host command to speculatively generate a new list of the USB host commands most likely to follow behind the most recently received USB host command, and translates each to one or more instructions/commands suitable for the data storage devices 206 of storage media 204. Those instructions/commands are then stored in memory (e.g., list 226) of the USB mass storage device 202 in association with each of their respective speculatively generated USB host commands, as described above.

Figure 3A:
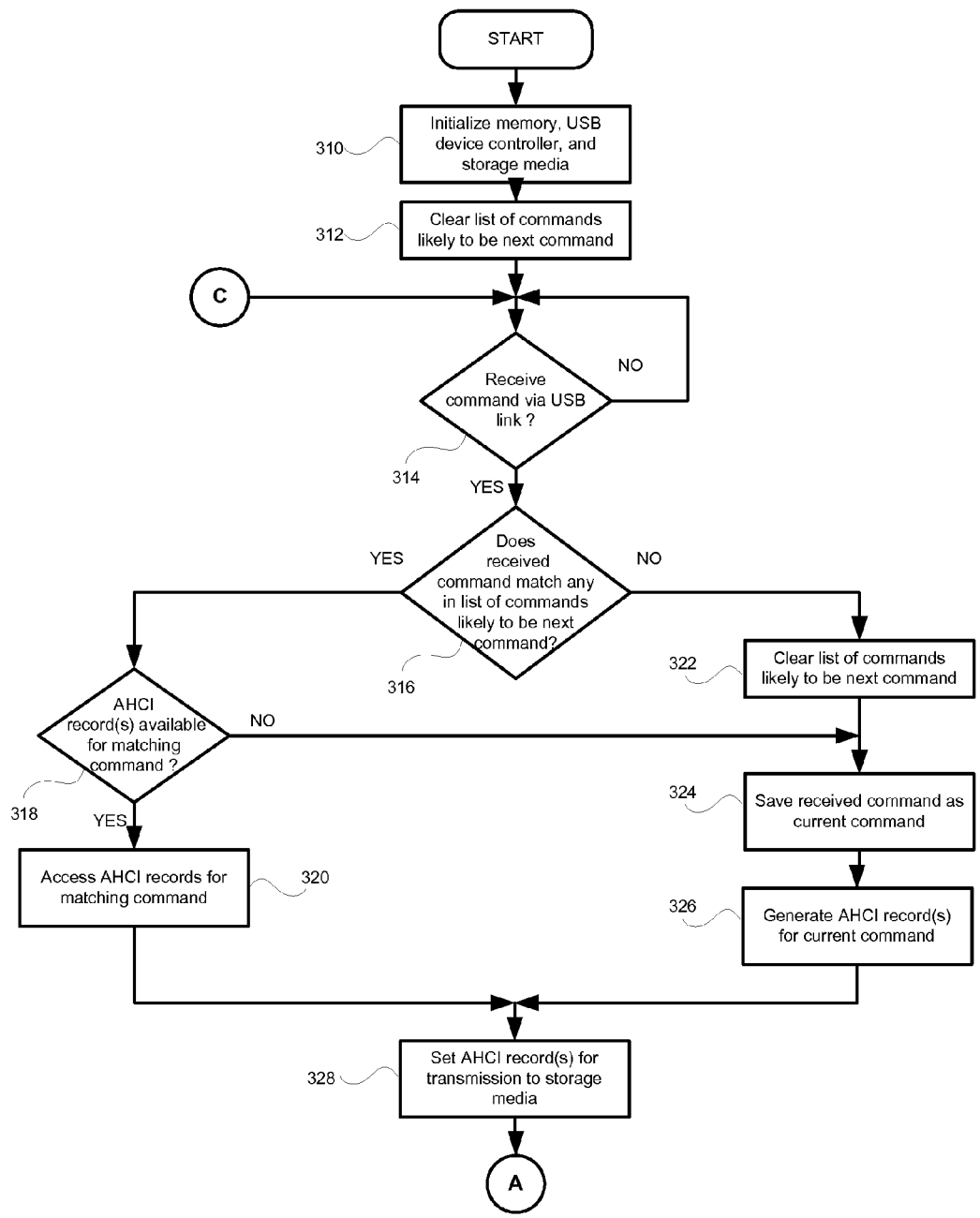
FIGS. 3A-3C are a flowchart illustrating actions of an exemplary method of operating a USB mass storage device, such as the USB mass storage device of FIG. 2, that supports speculative read-ahead to improve system throughput, in accordance with a representative embodiment of the present invention.
Figure 3B:
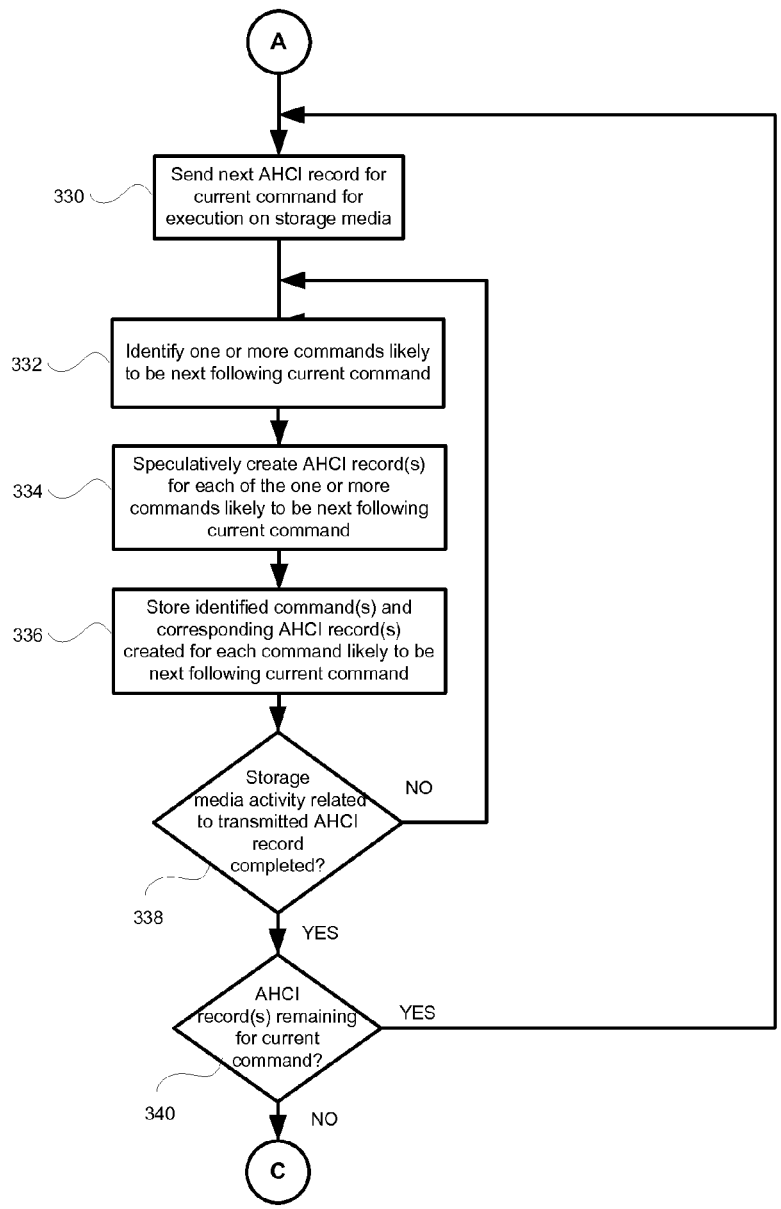
Figure 3C:
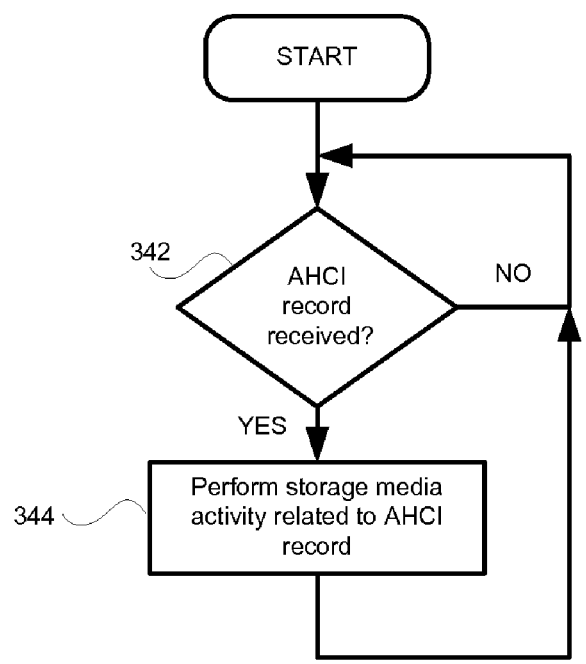

FIGS. 3A-3C are a flowchart illustrating actions of an exemplary method of operating a USB mass storage device, such as the USB mass storage device 202 of FIG. 2, that supports speculative read-ahead to improve system throughput, in accordance with a representative embodiment of the present invention. The following discussion of the actions of the method of FIGS. 3A-3C makes reference to the elements of FIG. 2 to aid in understanding.

The exemplary method begins at FIG. 3A, where a USB mass storage device such as, for example, the USB mass storage device 202 of FIG. 2 begins operation. The operation of the USB mass storage device 202 may begin at power-up by switching power to the device on, or attaching the device to a USB link such as the USB link 240 of FIG. 2, for example.

At block 310 of the method, the USB mass storage device may initialize memory (e.g., memory 224) of a media controller (e.g., media controller 220), and storage media (e.g., storage media 204) that make up the USB mass storage device 202. Next, at block 312, a processor of the media controller may clear all entries in a portion of memory used to store a list of commands speculatively generated as those likely to be the next command received from a USB host device such as, for example, the USB host device 250. Such a list may reside, for example, in the memory 224 of FIG. 2. Then, at block 314, the method waits for a command to be received from the USB host device via a USB link such as the USB link 240 of FIG. 2. If a command is received from the USB host device, the method transitions to block 316 to begin processing the received USB host command. Otherwise, the method continues to wait for a command from the USB host device by looping at block 314.

If, at block 314, a USB host command is received from the USB host device 250, the method of FIG. 3A then, at block 316, determines whether the received USB host command matches any of the commands in the list of speculatively generated USB host commands likely to be the next received (e.g., list 226). It should be noted that, as previously mentioned, the list of speculatively generated USB host commands likely to be the next command received is cleared at startup. However, after receiving and processing a first USB host command, one or more speculatively generated USB host commands may be present in the list. If a match is found, the method of FIG. 3A moves on to block 318, where the media controller determines whether instructions/commands for the data storage devices of the storage media (e.g., data storage device(s) 206 of storage media 204) corresponding to the matching USB host command are currently available in memory (e.g. memory 224) of the USB mass storage device. As previously mention, such instructions/commands for the data storage device(s) of the storage media 204 may also be referred to herein as "Advanced Host Controller Interface (AHCI) records." If instructions/commands corresponding to the matching USB host command are available in memory 224 of the USB mass storage device 202 then, at block 320, a processor such as, for example, the processor 222 of FIG. 2 in performing the method of FIG. 3A, accesses the instructions/commands corresponding to the matching USB host command and, at block 328, causes those instructions/commands to be sent to the appropriate data storage device 206 of the storage media 204. The method of FIG. 3A then transitions to block 330 of FIG. 3B.

If it is determined, however, that instructions/commands for the matching USB host command are not available in memory (e.g., memory 224), then at block 324, the processor of the media controller makes the received USB host command the current USB host command and, at block 326, translates the received USB host command to one or more instructions/commands suitable for execution by the appropriate data storage device 206 of the storage media 204. The method then moves on to block 328, which causes those instructions/commands to be sent to the appropriate data storage device 206 of the storage media 204 via host controller 228 and communication link 210. The method then transitions to block 330 of FIG. 3B.

At block 330, the method of FIG. 3B sends the next of the instructions/commands associated with the current USB host command to the data storage device 206 of the storage media 204 of the USB mass storage device. Then, at block 332, the processor of the media controller (e.g., processor 222 of media controller 220) uses the time while the accessed data storage device is active to speculatively create and store in memory (e.g., list 226) one or more USB host commands likely to be the next received from the USB host, based upon the USB host command currently being performed. Next, at block 334, the processor of the media controller creates and stores in memory one or more instructions/commands corresponding to each of the USB host commands in the list of speculatively created USB host commands. At block 338, the method determines whether the activity of the accessed data storage device has been completed. If not, the method of FIG. 3B loops back to block 332 to continue identifying commands likely to be received next from the USB host device (e.g., USB host device 250). If it is determined at block 338 that the current activity of the accessed data storage device has been completed, the method transitions to block 340, and determines whether any instructions/commands for the accessed data storage device remain to be sent. If there are additional instructions/commands for the accessed data storage device, the method of FIG. 3B loops back to block 330, to send the next available instruction/command to the accessed data storage device. If there are no remaining instructions/commands for the accessed data storage device, the method transitions to block 314 of FIG. 3A to await the receipt of a command from the USB host device.

FIG. 3C is a flow chart illustrating, at a high level, exemplary actions of a data storage device such as, for example, the data storage device 206 in a representative embodiment of the present invention. As in FIG. 3A and FIG. 3B, the data storage device may be, for example, a hard disk drive/rotating data storage device compatible with a SATA interface protocol. The actions of the method of FIG. 3C begin with application of power to a USB mass storage device such as the USB mass storage device 202 of FIG. 2, as described above. It should be noted that the actions of FIG. 3C may occur in parallel with the functions of a media controller and USB device controller of a USB mass storage device such as the media controller 220 and the USB device controller 230 of the USB mass storage device 202 shown in FIG. 2.

The method of FIG. 3C, at block 342, determines whether the data storage device has received an instruction/command. If not, the method of FIG. 3C loops back to block 342. If an instruction/command has been received, however, the data storage device (e.g., data storage device 206) performs the received instruction. After the instruction/command has been completed and any data/status information sent to the media controller 220, the method of FIG. 3C then returns to block 342 to begin waiting for receipt of the next instruction/command from media controller 220.

In another representative embodiment of the present invention, the inventive concept described above may be extended to further make use of the time waiting for the next USB host device command. When a media controller in accordance with such a representative embodiment of the present invention speculates that one of the most likely next USB host commands is a "READ" command, the media controller may issue to the data storage device (e.g., data storage device 206) the appropriate instructions/commands to actually initiate the "READ" command speculatively identified, without waiting for a subsequent command from the USB host device. As discussed above, the USB host device commands identified by the media controller of a representative embodiment of the present invention are those commands most likely to be the next received from the USB host device. Instead of translating the speculatively generated USB host device "READ" command into a corresponding set of instructions/commands for storage and later use, as described above, one representative embodiment of the present invention may send the instructions/commands translated from the speculatively generated USB host device "READ" command to the data storage device 206. This permits the data storage device 206 to begin a "read" access as if the speculatively generated USB host device "READ" command had, in fact, been received. If the next command actually received from the USB host device 250 turns out to be the USB host device "READ" command speculatively identified by the media controller 220, then the time that would have been spent simply waiting for the next command from the USB host device 250 is instead put to good use performing the "read" access indicated by the received command, and response to the access is improved.

If, however, the next command received from the USB host device 250 is not the USB host device "READ" command speculatively identified by the media controller 220, then the data from the accessed portion of the data storage device 206 resulting from execution of the instructions/commands speculatively sent to the data storage device 206 is simply discarded. The actual command received from the USB host device 250 is then translated, as described above, into instructions/commands for the data storage device 206 appropriate for the command actually received from the USB host device 250. The cost of such an incorrect speculation that the next USB host device command would be a "READ" command is simply the difference between the total transfer time and the time required for the USB host device 250 to transmit to the media controller 220 the actual next USB host device command.

FIGS. 4A-4E are a flowchart illustrating the actions of another exemplary method of operating a USB mass storage device such as, for example, the USB mass storage device 202 of FIG. 2 that supports speculative read-ahead to improve system throughput, in accordance with a representative embodiment of the present invention. The following discussion of the actions of the method of FIGS. 4A-4E makes reference to the elements of FIG. 2 to help clarify aspects of the method.

Figure 4A:
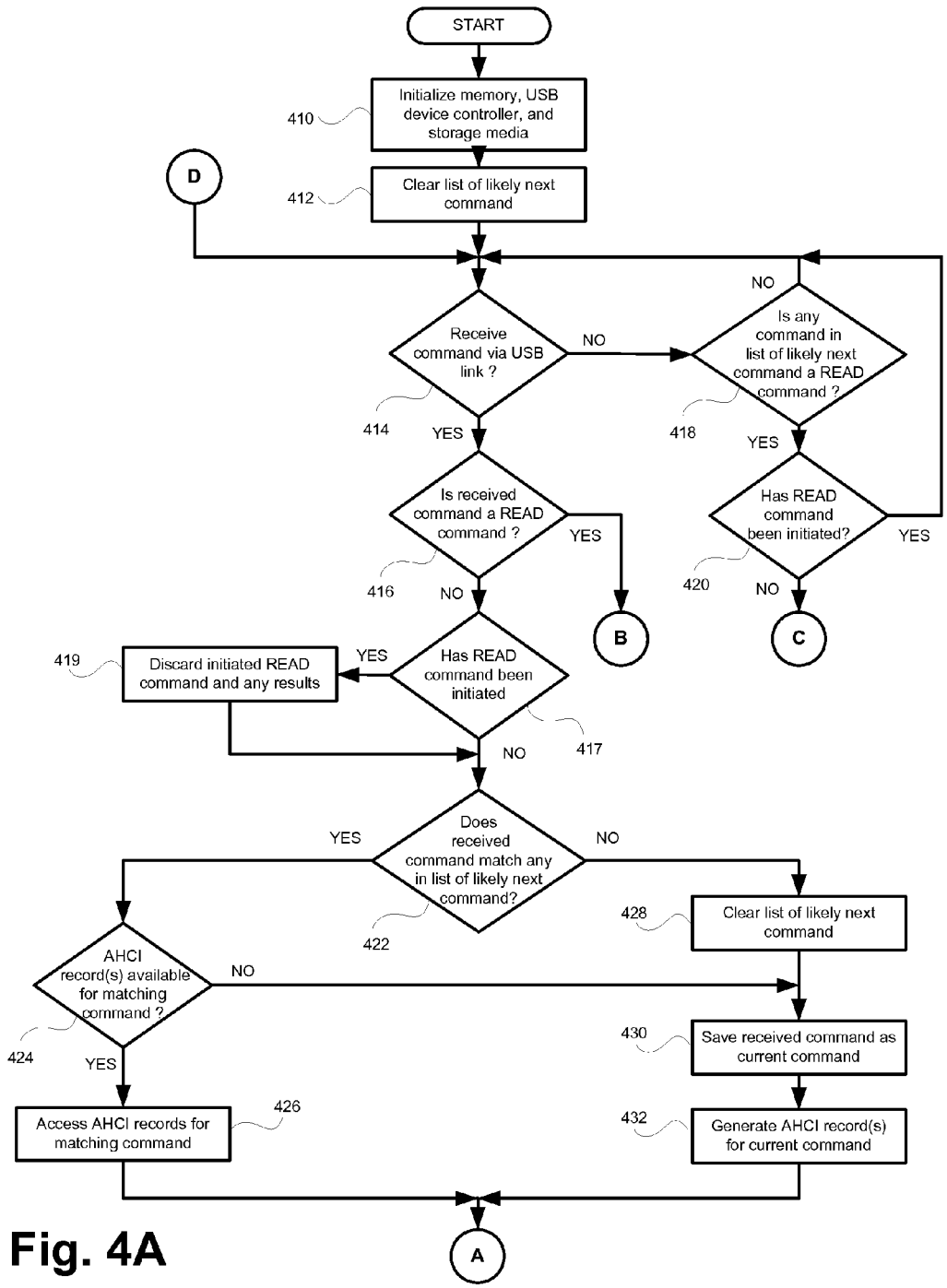
FIGS. 4A-4E are a flowchart illustrating the actions of another exemplary method of operating a USB mass storage device such as, for example, the USB mass storage device of FIG. 2 that supports speculative read-ahead to improve system throughput, in accordance with a representative embodiment of the present invention.

The exemplary method begins at FIG. 4A, where a USB mass storage device such as, for example, the USB mass storage device 202 of FIG. 2 begins operation. The operation of the USB mass storage device 202 may begin at power-up when the power to the device is switched on, or when the device is attached to a USB link such as the USB link 240 of FIG. 2, for example. At block 410 of the method, the USB mass storage device may first initialize memory (e.g., memory 224) of a media controller (e.g., media controller 220), and initialize circuitry to control storage media (e.g., storage media 204) that make up the USB mass storage device 202. Next, at block 412, a processor of the media controller may clear all entries in a portion of memory used to store a list of commands speculatively generated as those likely to be the next command received from a USB host device such as, for example, the USB host device 250. Such a list may reside, for example, in list 226 of the memory 224. Then, at block 414, the method of FIG. 4A checks whether a command has been received from the USB host device 250 via a USB link such as the USB link 240 of FIG. 2.

If, at block 414, it is determined that a command has not been received from the USB host device, the method transitions to block 418, where the method determines whether any of commands in the list of speculatively generated commands likely to be the next command received from the USB host device is a "READ" command. If no command in the list of speculatively generated commands 226 is a "READ" command, the method returns to block 414 to continue checking for receipt of a new command from the USB host device 250. It should be noted that, as previously mentioned, the list of speculatively generated USB host commands likely to be the next command received is cleared at startup. However, after receiving and processing a first USB host command, one or more speculatively generated USB host commands may be present in the list.

If, at block 418, a "READ" command is found in the list of speculatively generated commands 226, a determination is made at block 420 whether the "READ" command has already been initiated and is being processed by, for example, a data storage device 206 of the storage media 204. If the "READ" command has already been initiated, the method of FIG. 4A returns to block 414 to continue checking whether a new command has been received from the USB host device 250. However, if at block 420 the "READ" command found in the list of speculatively generated commands 226 has not yet been initiated, the method of FIG. 4A proceeds to block 474, which will be described below.

If the method of FIG. 4A determines, at block 414, that a new command has been received from the USB host device 250, the method proceeds to block 416, where the method determines whether the command received from the USB host device 250 is a "READ" command. If the received command is found to be a "READ" command, the method continues at block 452, as further described below. However, if the received command is not a "READ" command, the method continues at block 417, where the method determines whether a "READ" command has already been initiated. If a "READ" command has not been initiated, the method of FIG. 4A proceeds to block 422 to begin processing the received USB host command. If, at block 417, it is determined that a "READ" command has already been initiated, the method then, at block 419, discards the initiated "READ" command and any results. The method then transitions to block 422.

At block 422, the method of FIG. 4A determines whether the received USB host command matches any of the commands in the list of speculatively generated USB host commands likely to be the next received (e.g., list 226). It should again be noted that, as previously mentioned, the list of speculatively generated USB host commands likely to be the next command received is cleared at startup. However, after receiving and processing a first USB host command, one or more speculatively generated USB host commands may have been stored in the list.

If, at block 422, it is determined that the command received from the USB host device does not match any command in the list of speculatively generated USB host commands 226, the method of FIG. 4A then moves to block 428, where the list of speculatively generated commands 226 is cleared. The method of FIG. 4A then, at block 430, saves the received USB host device command as the current command, and at block 432, translates the current USB host device command to one or more instructions/commands (a.k.a., AHCI records) needed to perform the command received from the USB host device 250 suitable for transmission to and execution by the data storage device 206 of the storage media 204. The method of FIG. 4A then proceeds to block 434 of FIG. 4B.

However, if a match is found in the list of speculatively generated commands 226, at block 422, the method of FIG. 4A then moves to block 424, where the media controller 220 determines whether instructions/commands for the data storage devices of the storage media (e.g., data storage device(s) 206 of storage media 204) corresponding to the matching USB host command have already been prepared and are currently available in memory (e.g. memory 224) of the USB mass storage device. If instructions/commands corresponding to the matching USB host command are not available in memory 224, the method of FIG. 4A proceeds to block 430, and continues as described above. If, however, instructions/ commands corresponding to the matching USB host command are available in memory 224 of the USB mass storage device 202 then, at block 426, the method of FIG. 4A accesses the stored instructions/commands corresponding to the matching USB host command, and proceeds to block 434 shown in FIG. 4B.

Figure 4B:
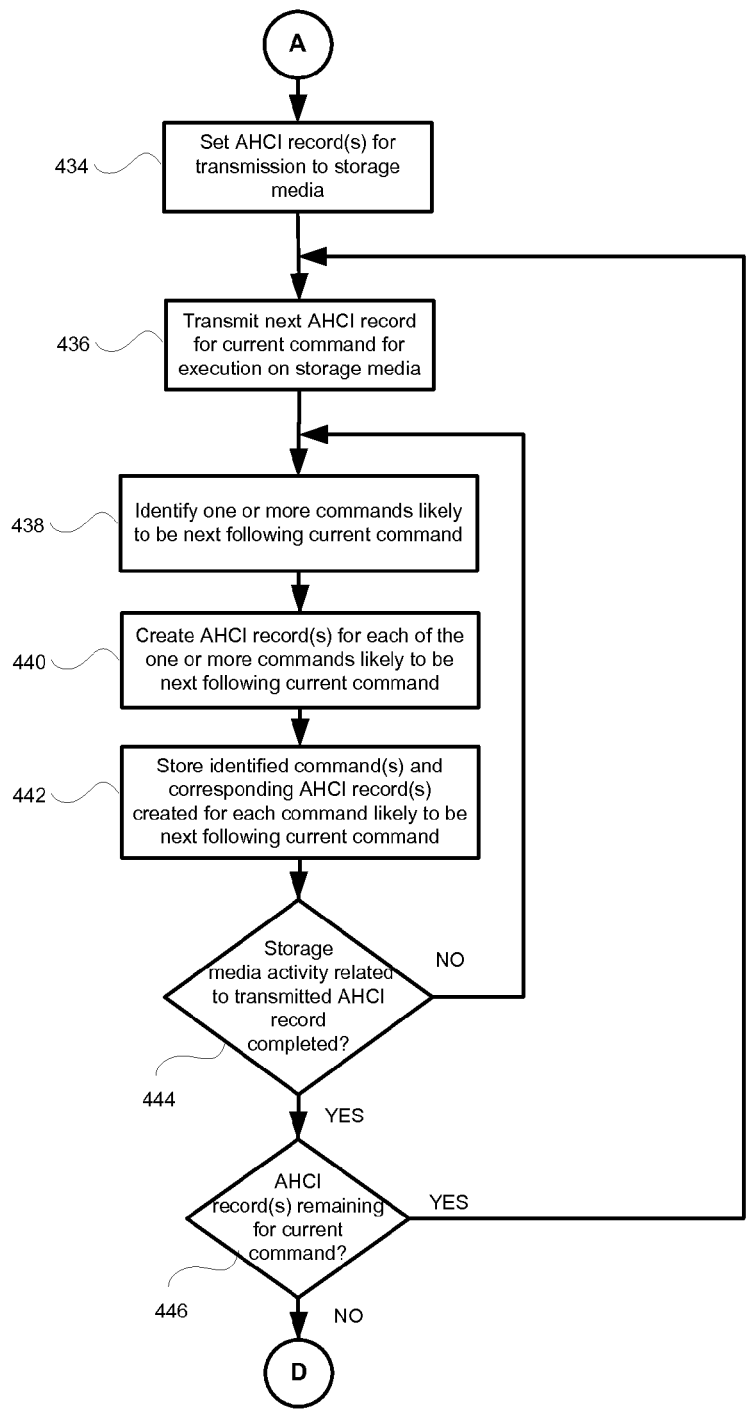

FIG. 4B illustrates additional steps of the method introduced in FIG. 4A, beginning at block 434, where the method causes the instructions/commands from step 426 or step 432 to be sent to the appropriate data storage device 206 of the storage media 204. The method of FIG. 4B then transitions to block 436. At block 436, the method of FIG. 4B sends the next of the instructions/commands associated with the current USB host command to the data storage device 206 of the USB mass storage device 202. Then, at block 438, the processor of the media controller (e.g., processor 222 of media controller 220) uses the time while the accessed data storage device is active to speculatively generate/produce and store in memory (e.g., list 226) one or more USB host commands likely to be the next received from the USB host device 250, based upon the USB host command currently being performed. Next, at block 440, the processor of the media controller creates and stores in memory (e.g., memory 224) one or more instructions/commands corresponding to each of the USB host device commands in the list of speculatively created USB host device commands 226. At block 442, the method determines whether the activity of the accessed data storage device (e.g., data storage device 206) has been completed. If not, the method of FIG. 4B loops back to block 438 to continue identifying commands likely to be received next from the USB host device (e.g., USB host device 250). If it is determined at block 444 that the current activity of the accessed data storage device has been completed, the method transitions to block 446, and determines whether any instructions/commands for the accessed data storage device remain to be sent. If there are additional instructions/commands for the accessed data storage device, the method of FIG. 4B then loops back to block 436, to send the next available instruction/command to the accessed data storage device. If there are no remaining instructions/commands for the accessed data storage device (e.g., data storage device 206), the method transitions to block 414 of FIG. 4A to await the receipt of a command from the USB host device.

Figure 4C:
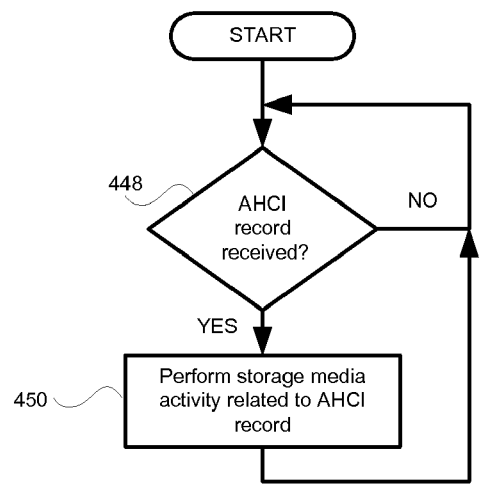
Figure 4D:
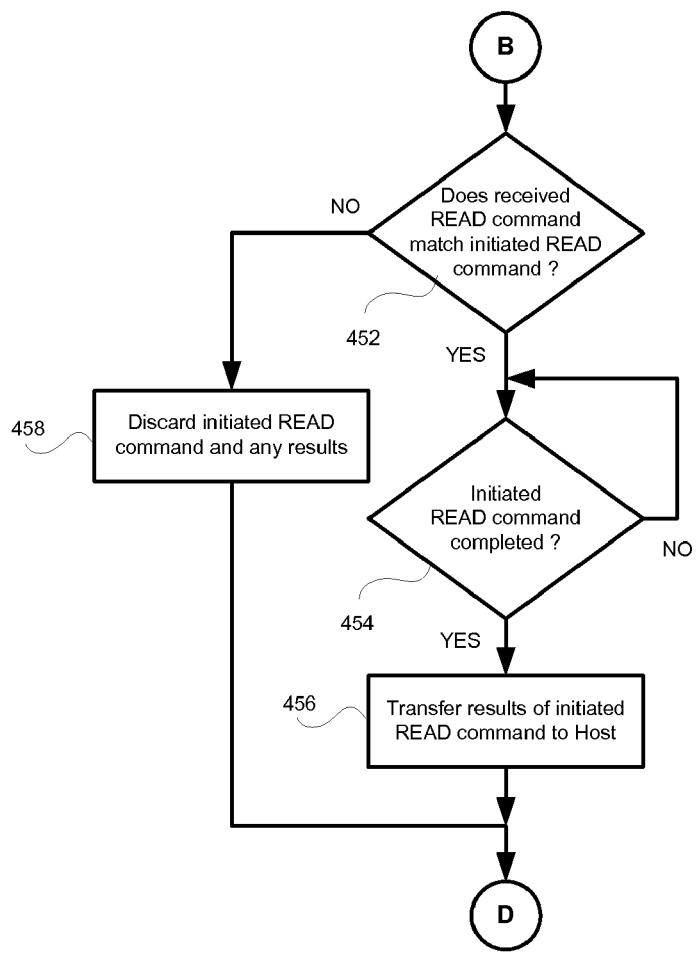

FIG. 4D illustrates additional actions of the method of FIGS. 4A-4E continuing at block 452 from the determination at block 416 of FIG. 4A that a command received from the USB host device 250 is a "READ" command. At block 452, the method of FIG. 4D determines whether the "READ" command received from the USB host device 250 matches a "READ" command that was initiated after being identified in the list of speculatively generated commands likely to be the next received from the USB host device 250 (i.e., list 226). If, at block 452, it is determined that the "READ" command received from the USB host device 250 matches the speculatively initiated "READ" command identified in the list of commands likely to be next received from the USB host device, the method of FIG. 4D then determines whether the actions of the data storage device (e.g., data storage device 206) to which the instructions/commands corresponding to the speculatively initiated "READ" command were sent for execution have been completed. If the actions associated with the speculatively initiated "READ" command have not completed, the method of FIG. 4D waits, by looping at block 454. If, however, the actions associated with the speculatively initiated "READ" command have completed, the media controller 220 may, performing the action of block 456 of the method, transfer any data retrieved by and results of the completed "READ" command to the USB host device 250. After completing the transfer of information to the USB host device, the method of FIG. 4D proceeds to block 414.

If, however, it is determined at block 452 that the "READ" command received from the USB host device 250 does not match the speculatively initiated "READ" command identified in the list of commands likely to be next received from the USB host device, the method of FIG. 4D then continues to block 458, where the method discards the "READ" command, any retrieved data, and any results, and proceeds to block 414.

FIG. 4C is a flow chart illustrating, at a high level, exemplary actions of a data storage device such as, for example, the data storage device 206 in a representative embodiment of the present invention. As in FIG. 4A and FIG. 4B, the data storage device may be, for example, a hard disk drive compatible with a SATA interface protocol. The actions of the method of FIG. 4C begin with application of power to a USB mass storage device such as the USB mass storage device 202 of FIG. 2, as described above. It should be noted that the actions of FIG. 4C may occur in parallel with the functions of a media controller and USB device controller of a USB mass storage device such as the media controller 220 and the USB device controller 230 of the USB mass storage device 202 shown in FIG. 2.

The method of FIG. 4C, at block 448, determines whether the data storage device has received an instruction/command. If not, the method of FIG. 4C loops back to block 448. If an instruction/command has been received, however, the data storage device (e.g., data storage device 206) performs the received instruction, at block 450. After the instruction/command has been completed and any data/status information sent to the media controller 220, the method of FIG. 4C then returns to block 448 to begin waiting for receipt if the next instruction/command from media controller 220.

Figure 4E:
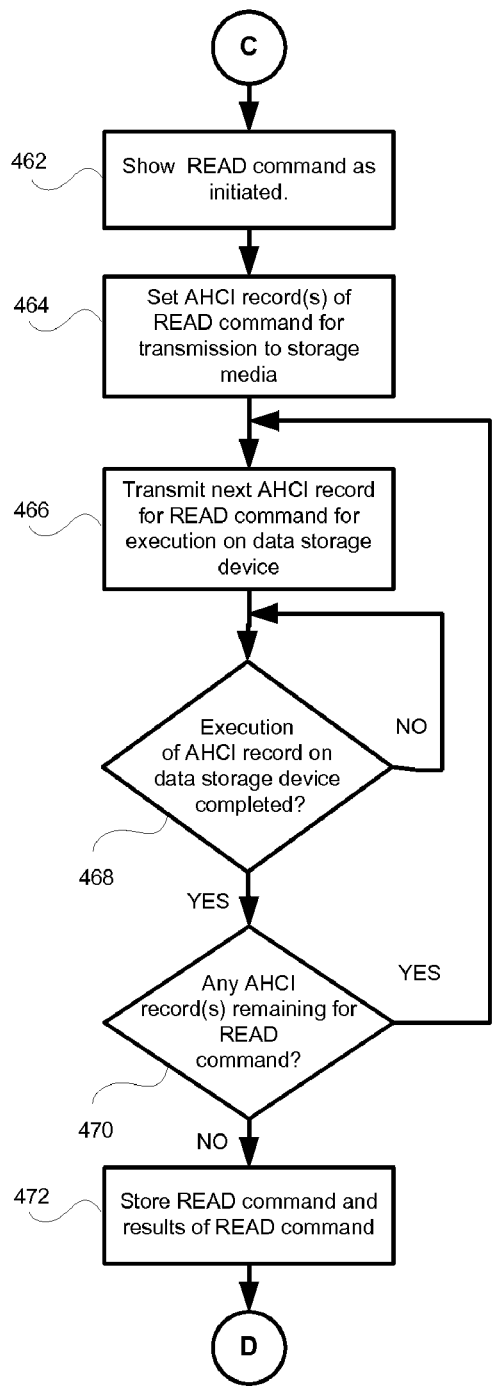

FIG. 4E illustrates additional actions of the method of FIGS. 4A-4E continuing from the determination at block 420 of FIG. 4A that a USB host device "READ" command was identified in the speculatively generated list of commands likely to be next received from the USB host device 250 (block 418), and that the identified "READ" command had not been initiated on any data storage device 206 of the storage media 204 illustrated in FIG. 2 (block 420). At block 462 of FIG. 4E, the "READ" command identified in the speculatively generated list of commands likely to be next received (e.g., list 226) is marked to show that it has been initiated. Next, the method of FIG. 4E, at block 464, sets up the instructions/commands (a.k.a., AHCI Records) corresponding to the identified "READ" command for transmission to a data storage device such as, for example, one of the data storage device 206 of the storage media 204 of FIG. 2. Then, at block 466, the method transmits the next instruction/command for the initiated "READ" command for execution on the data storage device 206. The method then determines, at block 468, whether execution of the last instruction/command transmitted to the data storage device 206 has been completed. If the last command transmitted to the data storage device 206 has not been completed, the method loops at block 468. If the last instruction/command transmitted to the data storage device 206 has been completed, the method of FIG. 4E then determines whether any instructions/commands corresponding to the initiated "READ" command remain to be performed (block 470). If there is an additional instruction/command to be executed, the method of FIG. 4E loops back to block 466, which transmits the next instruction/command to the data storage device 206 for execution. If, however, no additional instructions/commands corresponding to the initiated "READ" command remain, the method moves to block 472, where the method stores any data and/or results produced by execution of the instructions/commands of the initiated "READ" command. The method then continues at block 414 of FIG. 4A, and proceeds as described above.

In another representative embodiment of the present invention, the media controller of a USB mass storage device such as those illustrated in FIG. 2 may achieve improved efficiency of accesses to the data storage devices 206 by tracking the amount of time that the USB host device 250 takes to issue each command following completion of the immediately prior command issued, and adjusting parameters of the speculatively generated USB host commands described above, to make use of some of the time that data storage devices of a USB mass storage device may normally be idle.

Data storage device(s) of a USB mass storage device are normally idle during the period of time between completion of one USB host device command and the receipt of a following command. As described above, a media controller such as the media controller 220 may upon receiving a command from a USB host device speculatively generate a list of USB host commands likely to be the next command received from the USB host device. The media controller 220 may choose to transmit to the data storage device(s) 206 of the USB mass storage device 202 instruction(s)/command(s) that correspond to one or more of the USB host device commands speculatively generated by the media controller 220. Such instruction(s)/command(s) transmitted to the data storage device(s) may be arranged to take less time to complete than the amount of time that the tracking of the USB host device behavior indicates the USB host device will take to issue the next command to the USB mass storage device 202. In this way, a USB mass storage device in accordance with a representative embodiment of the present invention makes more efficient use of and provides shorter access times to the data storage devices of the USB mass storage device.

For example, in a representative embodiment of the present invention, a processor such as the processor 222 of the USB mass storage device 202 may monitor or track the behavior of the USB host device 250 during a series of accesses to the USB mass storage device 202, measuring the amount of time the USB host device 250 takes to issue one command after completion of the previous command. The processor 222 may determine that the USB host device 250 takes, for example, a minimum of 27 microseconds after the completion of one access before it issues the next command to the USB mass storage device 202. A representative embodiment of the present invention may speculatively generate a list or set of one or more USB host device commands likely to be the next USB host device command received from the USB host device 250, as described above. A processor of a representative embodiment of the present invention may, for example, speculate that the next USB host device command will likely be a "READ" command to retrieve 64 Kbytes of a particular data storage device of the USB mass storage device 202. Using the information gathered about the time needed by the USB host device to issue a next command, a representative embodiment of the present invention may modify or adjust parameters in a command from the list commands likely to be the next USB host device command received so that the modified or adjusted command is able to be completed by the USB mass storage device 202 before the USB host device 250 is expected to issue its next command to the USB mass storage device 202 (e.g., in less than 27 microseconds). To illustrate using the "READ" command of this example, the amount of data being read may be adjusted from the original 64 Kbyte amount speculated, to a lower amount that can be retrieved from the storage media before the next command arrives from the USB host device 250. The amount of data retrieved by the adjusted "READ" command may be based on the amount of time taken by the USB host device to issue a subsequent command to the USB mass storage device following completion of the previous USB host device command. If a "READ" command to retrieve, for example, 64 Kbytes is then actually received from the USB host device 250, the processor 222 may generate a succeeding command to read an amount equal to the difference of the first read, and the 64 Kbytes indicated in the command actually received by the USB mass storage device 202 from the USB host device 250, so that all requested data is read. Although a "READ" command has been used in the above discussion, this does not represent a specific limitation of a representative embodiment of the present invention.

Figure 5:
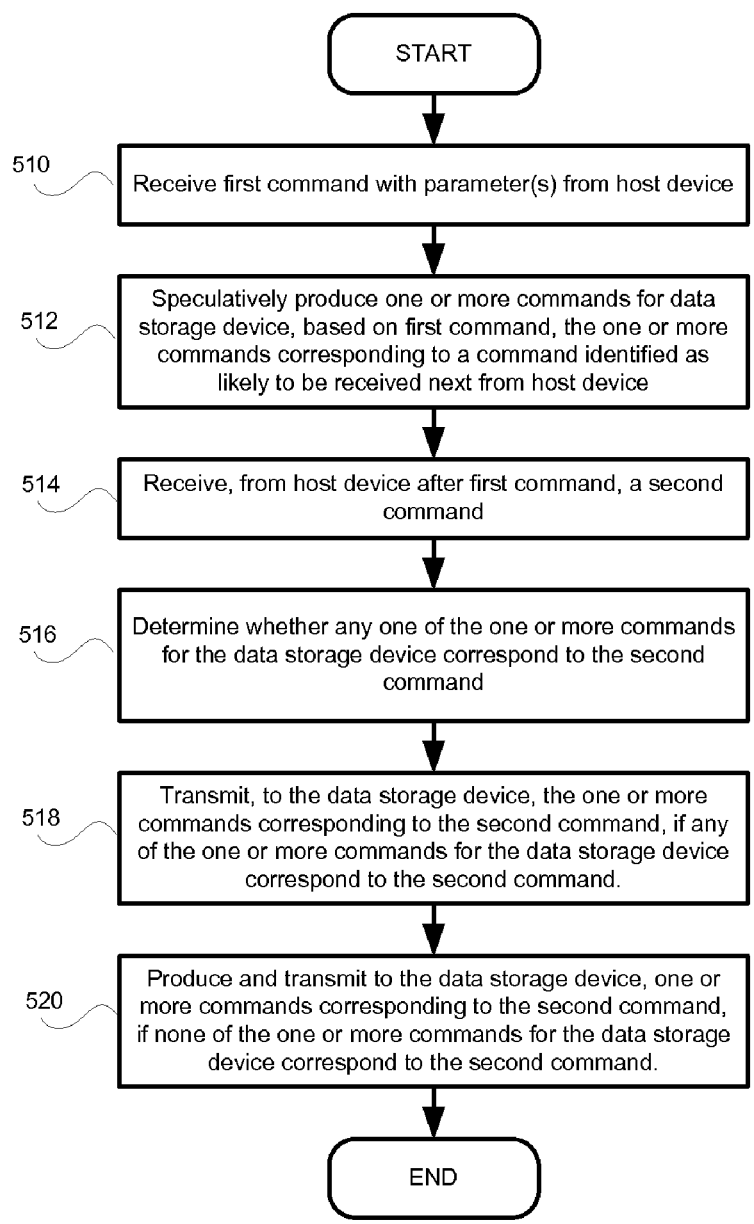
FIG. 5 is a flowchart of an exemplary method of operating a data storage device controller such as, for example, the media controller of FIG. 2, in accordance with a representative embodiment of the present invention.

FIG. 5 is a flowchart of an exemplary method of operating a data storage device controller such as, for example, the media controller 220 of FIG. 2, in accordance with a representative embodiment of the present invention. The following discussion makes reference to elements of FIG. 2 to help clarify operation of the method.

The method of FIG. 5 begins at block 510 where a data storage device controller such as, for example, the media controller 220 of FIG. 2 receives, from a host device (e.g., the USB host device 250), a first command comprising one or more parameters. The first command may be received, for example, via a USB link such as the USB link 240 shown in FIG. 2. Next, at block 512, the method of FIG. 2 speculatively produces, based upon the first command, one or more commands for a data storage device such as, for example, the data storage device 206 of FIG. 2. Such speculative commands may be temporarily stored in, for example, the memory 224. In a representative embodiment of the present invention, each of the one or more commands may correspond to a command identified as likely to be received next from the host device.

At block 514, the data storage device controller (e.g., media controller 220) receives a second command from the USB host device, after previously receiving the first command. The method of FIG. 5 then proceeds to block 516, where the method determines whether any of the one or more commands for the data storage device produced speculatively based on the first command correspond to the received second command. Next, at step 518, the method transmits to the data storage device the one or more commands corresponding to the second command, if in fact, any of the one or more commands previously speculatively produced for the data storage device correspond to the second command. Alternately, at block 520, the data storage device controller performing the method of FIG. 2 would instead produce and transmit to the data storage device (e.g. data storage device 206), one or more commands corresponding to the second command, if none of the one or more commands speculatively produced for the data storage device correspond to the second command.

In some representative embodiments of the present invention, speculatively producing commands may include speculatively producing one or more host commands based upon the first command, and translating each of the one or more host commands to a corresponding one or more commands compatible with the data storage device. For some representative embodiments, speculatively producing one or more commands for the data storage device may include determining an amount of time taken by the host device to generate a command, and setting one or more parameters in a command for the data storage device, based upon the amount of time. In various representative embodiments of the present invention, speculatively producing one or more commands for the data storage device may include determining whether any of the commands identified as likely to be received next from the host device is a command to read data from the data storage device. Such embodiments may also include initiating reading of data from the data storage device according to the identified command to read data, without waiting to receive a command to read data from the host device, if a command to read data from the data storage device is identified as likely to be received next from the host device.

It should be noted that although the illustration of FIG. 5 is shown as ending at block 520, in a representative embodiment the actions of FIG. 5 could be part of a loop processing each command from a USB host device such as the USB host device 250 of FIG. 2, for example.

Aspects of a representative embodiment of the present invention may be seen in a data storage device controller comprising at least one processor operably coupled to memory and to interface circuitry enabling communication with a host device and a data storage device. The at least one processor may be operable to, at least, receive, from the host device via the interface circuitry, a first command comprising one or more parameters, and speculatively produce, based upon the first command, one or more commands for the data storage device. Each of the one or more commands may correspond to a command identified as likely to be received next from the host device. In addition, the at least one processor may be operable to receive, from the host device via the interface circuitry after the first command, a second command, and determine whether any of the one or more commands for the data storage device correspond to the second command. The at least one processor may be further able to transmit, to the data storage device, the one or more commands corresponding to the second command, if any of the one or more commands for the data storage device correspond to the second command. The at least one processor may also be operable to produce and transmit to the data storage device, one or more commands corresponding to the second command, if none of the one or more commands for the data storage device correspond to the second command.

In a representative embodiment of the present invention, speculatively producing one or more commands for the data storage device may comprise speculatively producing one or more host commands based upon the first command, and translating each of the one or more host commands to a corresponding one or more commands compatible with the data storage device. Speculatively producing one or more commands for the data storage device may also comprise determining an amount of time taken by the host device to generate a command, and setting one or more parameters in a command for the data storage device based upon the amount of time. In such an embodiment, the one or more parameters may comprise an amount of data to be retrieved from the data storage device. Speculatively producing one or more commands for the data storage device may also comprise determining whether any of the commands identified as likely to be received next from the host device is a command to read data from the data storage device. It may also comprise initiating reading of data from the data storage device according to the identified command to read data without waiting to receive the command to read data from the host device, if a command to read data from the data storage device is identified as likely to be received next from the host device.

In a representative embodiment of the present invention, the interface circuitry may communicate with the host device over a Universal Serial Bus link, the data storage device may comprise a rotating disk data storage device, and the interface circuitry may communicate with the data storage device using a Serial AT Attachment (SATA) interface. In addition, the one or more commands for the data storage device may comprise Advanced Host Computer Interface (AHCI) commands.

Yet another representative embodiment of the present invention may be found in a method of operating a data storage device controller. Such a method may comprise receiving, from a host device, a first command comprising one or more parameters, storing the first command in a memory, and speculatively producing, based upon the first command, one or more commands for a data storage device, wherein each of the one or more commands correspond to a command identified as likely to be received next from the host device. The method may further comprise receiving, from the host device, after the first command, a second command, and determining whether any of the one or more commands for the data storage device correspond to the second command. The method may also comprise transmitting, to the data storage device, the one or more commands corresponding to the second command, if any of the one or more commands for the data storage device correspond to the second command. Still further, the method may comprise producing and transmitting to the data storage device, one or more commands corresponding to the second command, if none of the one or more commands for the data storage device correspond to the second command.

In such a method, speculatively producing one or more commands for the data storage device may comprise speculatively producing one or more host commands based upon the first command, and translating each of the one or more host commands to a corresponding one or more commands compatible with the data storage device. Speculatively producing one or more commands for the data storage device may also comprise determining an amount of time taken by the host device to generate a command, and setting one or more parameters in a command for the data storage device based upon the amount of time. The one or more parameters may comprise an amount of data to be retrieved from the data storage device.

In a representative embodiment of the present invention, speculatively producing one or more commands for the data storage device may also comprise determining whether any of the commands identified as likely to be received next from the host device is a command to read data from the data storage device. In addition, speculatively producing one or more commands may comprise initiating reading of data from the data storage device according to the identified command to read data, without waiting to receive the command to read data from the host device, if a command to read data from the data storage device is identified as likely to be received next from the host device. Commands may be received from the host device over a Universal Serial Bus link. The data storage device may comprise a rotating disk data storage device, and communication with the data storage device may use a Serial AT Attachment (SATA) interface. The one or more commands for the data storage device may, in some representative embodiments comprise Advanced Host Computer Interface (AHCI) commands.

A further representative embodiment of the present invention may be observed in a data storage system comprising interface circuitry enabling communication with a host device and a data storage device, and at least one processor operably coupled to memory and the interface circuitry. The at least one processor may be operable to, at least, speculatively produce, based upon a first command received from the host device, one or more commands for the data storage device, wherein each of the one or more commands for the data storage device correspond to a command identified as likely to be received next from the host device. The at least one processor may also be operable to receive a second command from the host device after the first command, and to determine whether any of the speculatively produced one or more commands for the data storage device correspond to the second command received from the host device after the first command. In addition, the at least one processor may be operable to transmit, to the data storage device, the speculatively produced one or more commands corresponding to the second command, if the speculatively produced one or more commands for the data storage device correspond to the second command received from the host. The at least one processor may also be operable to produce and transmit to the data storage device, one or more commands corresponding to the second command received from the host, if none of the speculatively produced one or more commands for the data storage device correspond to the second command received from the host.

In this representative embodiment, speculatively producing one or more commands for the data storage device may comprise speculatively producing one or more host commands based upon the first command; and translating each of the one or more host commands to a corresponding one or more commands compatible with the data storage device. Speculatively producing one or more commands for the data storage device may also comprise determining an amount of time taken by the host device to generate a command, and setting one or more parameters in a command for the data storage device based upon the amount of time, where the one or more parameters may represent an amount of data to be retrieved from the data storage device.

In a representative embodiment of the present invention, speculatively producing one or more commands for the data storage device may further comprise determining whether any of the commands identified as likely to be received next from the host device is a command to read data from the data storage device. Speculatively producing one or more commands for the data storage device may also comprise initiating reading of data from the data storage device according to the identified command to read data without waiting to receive the command to read data from the host device, if a command to read data from the data storage device is identified as likely to be received next from the host device. The interface circuitry may communicate with the host device over a Universal Serial Bus link. The data storage device may comprise a rotating disk data storage device, the interface circuitry may communicate with the data storage device using a Serial AT Attachment (SATA) interface, and the one or more commands for the data storage device may comprise Advanced Host Computer Interface (AHCI) commands.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A data storage device controller comprising:
at least one processor operably coupled to memory and to interface circuitry enabling communication with a host device and a data storage device, the at least one processor configured to, at least:
receive, from the host device via the interface circuitry, a first command comprising one or more parameters;
transmit, to the data storage device, the first command;
speculatively produce, based upon the first command, one or more commands for the data storage device, wherein each of the one or more commands corresponds to a command identified as likely to be received next from the host device, wherein speculatively producing one or more commands for the data storage device comprises:
  determining an amount of time taken by the host device to generate a command; and
  setting one or more parameters in a command for the data storage device based upon the amount of time;
receive, from the host device via the interface circuitry after the first command, a second command, after fulfillment of the first command;
determine whether any of the one or more commands for the data storage device corresponds to the second command;
transmit, to the data storage device, one command of the one or more commands corresponding to the second command, if any of the one or more commands for the data storage device correspond to the second command; and
produce and transmit to the data storage device, a command corresponding to the second command, if none of the one or more commands for the data storage device correspond to the second command.

2. The controller of claim 1 wherein speculatively producing one or more commands for the data storage device comprises:
speculatively producing one or more host commands based upon the first command; and
translating each of the one or more host commands to a corresponding one or more commands compatible with the data storage device.

3. The controller of claim 1 wherein the one or more parameters represents an amount of data to be retrieved from the data storage device.

4. The controller of claim 1 wherein speculatively producing one or more commands for the data storage device comprises:

determining whether any of the commands identified as likely to be received next from the host device is a command to read data from the data storage device; and initiating reading of data from the data storage device according to the identified command to read data without waiting to receive the command to read data from the host device, if a command to read data from the data storage device is identified as likely to be received next from the host device.

5. The controller of claim 1 wherein the interface circuitry communicates with the host device over a Universal Serial Bus link.

6. The controller of claim 1 wherein the data storage device comprises a rotating disk data storage device.

7. The controller of claim 1 wherein the interface circuitry communicates with the data storage device using a Serial AT Attachment (SATA) interface.

8. The controller of claim 1 wherein the one or more commands for the data storage device comprise Advanced Host Computer Interface (AHCI) commands.

9. A method of operating a data storage device controller, the method comprising:

receiving, from a host device, a first command comprising one or more parameters;

transmitting, to the data storage device, the first command;
speculatively producing, based upon the first command, one or more commands for a data storage device, wherein each of the one or more commands corresponds to a command identified as likely to be received next from the host device, wherein said speculatively producing one or more commands for the data storage device comprises:

determining an amount of time taken by the host device to generate a command; and setting one or more parameters in a command for the data storage device based upon the amount of time;

receiving, from the host device, after the first command, a second command, after fulfillment of the first command;

determining whether any of the one or more commands for the data storage device corresponds to the second command;

transmitting, to the data storage device, one command of the one or more commands corresponding to the second command, if any of the one or more commands for the data storage device correspond to the second command; and producing and transmitting to the data storage device, a command corresponding to the second command, if none of the one or more commands for the data storage device correspond to the second command.

10. The method of claim 9 wherein speculatively producing one or more commands for the data storage device comprises:

speculatively producing one or more host commands based upon the first command; and translating each of the one or more host commands to a corresponding one or more commands compatible with the data storage device.

11. The method of claim 9 wherein the one or more parameters comprise an amount of data to be retrieved from the data storage device.

12. The method of claim 9 wherein speculatively producing one or more commands for the data storage device comprises:

determining whether any of the commands identified as likely to be received next from the host device is a command to read data from the data storage device; and initiating reading of data from the data storage device according to the identified command to read data, without waiting to receive the command to read data from the host device, if a command to read data from the data storage device is identified as likely to be received next from the host device.

13. The method of claim 9 wherein commands are received from the host device over a Universal Serial Bus link.

14. The method of claim 9 wherein the data storage device comprises a rotating disk data storage device.

15. The method of claim 9 wherein communication with the data storage device uses a Serial AT Attachment (SATA) interface.

16. The method of claim 9 wherein the one or more commands for the data storage device comprise Advanced Host Computer Interface (AHCI) commands.

17. A data storage system comprising:

interface circuitry enabling communication with a host device and a data storage device; and at least one processor operably coupled to memory and the interface circuitry, the at least one processor configured to, at least:

receive, from the host device via the interface circuitry, a first command comprising one or more parameters;

transmit, to the data storage device, the first command;

speculatively produce, based upon the first command received from the host device, one or more commands for the data storage device, wherein each of the one or more commands for the data storage device correspond to a command identified as likely to be received next from the host device, wherein to speculatively produce one or more commands for the data storage device, the at least one processor is configured to:

determine an amount of time taken by the host device to generate a command; and set one or more parameters in a command for the data storage device based upon the amount of time;

determine whether any of the speculatively produced one or more commands for the data storage device corresponds to the second command received from the host device after the first command; and transmit, to the data storage device, one command of the speculatively produced one or more commands corresponding to the second command, if the speculatively produced one or more commands for the data storage device correspond to the second command received from the host, and produce and transmit to the data storage device, a command corresponding to the second command received from the host, if none of the speculatively produced one or more commands for the data storage device correspond to the second command received from the host.

18. The system of claim 17 wherein speculatively producing one or more commands for the data storage device comprises:

speculatively producing one or more host commands based upon the first command; and translating each of the one or more host commands to a corresponding one or more commands compatible with the data storage device.

19. The system of claim 17 wherein the one or more parameters comprise an amount of data to be retrieved from the data storage device.

20. The system of claim 17 wherein speculatively producing one or more commands for the data storage device comprises:

determining whether any of the commands identified as likely to be received next from the host device is a command to read data from the data storage device; and initiating reading of data from the data storage device according to the identified command to read data without waiting to receive the command to read data from the host device, if a command to read data from the data storage device is identified as likely to be received next from the host device.

21. The system of claim 17 wherein the interface circuitry communicates with the host device over a Universal Serial Bus link.

22. The system of claim 17 wherein the data storage device comprises a rotating disk data storage device.

23. The system of claim 17 wherein the interface circuitry communicates with the data storage device using a Serial AT Attachment (SATA) interface.

24. The system of claim 17 wherein the one or more commands for the data storage device comprise Advanced Host Computer Interface (AHCI) commands.

* * * * *